(12) United States Patent
Chaffotte et al.

(10) Patent No.: US 7,632,453 B2
(45) Date of Patent: Dec. 15, 2009

(54) GAS QUENCHING METHOD USING A RECYCLING FACILITY

(75) Inventors: Florent Chaffotte, Chatillon (FR); Nicolas Blanchard, Voreppe (FR); Olivier Delobel, Paris (FR); Linda Lefevre, Versailles (FR)

(73) Assignee: L'Air Liquide-Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 305 days.

(21) Appl. No.: 10/565,550

(22) PCT Filed: Aug. 10, 2004

(86) PCT No.: PCT/FR2004/050380

§ 371 (c)(1),
(2), (4) Date: Aug. 4, 2006

(87) PCT Pub. No.: WO2005/021805

PCT Pub. Date: Mar. 10, 2005

(65) Prior Publication Data

US 2006/0272752 A1 Dec. 7, 2006

(30) Foreign Application Priority Data

Aug. 21, 2003 (FR) .................................. 03 50441

(51) Int. Cl.
*C21D 1/62* (2006.01)
(52) U.S. Cl. .................. 266/156; 148/233; 148/251; 148/254; 148/626; 266/250; 266/254; 266/251
(58) Field of Classification Search ................. 266/156; 148/233

See application file for complete search history.

(56) References Cited

U.S. PATENT DOCUMENTS 4,298,190 A * 11/1981 MacKay .................... 266/156

(Continued)

FOREIGN PATENT DOCUMENTS

EP 0 388 332 9/1990

(Continued)

OTHER PUBLICATIONS

Donald J. Bowe. "Helium Recovery and recylcing Makes Good Business Sense". Air Products & Chemical Inc., Allentown, Pa.*

(Continued)

*Primary Examiner*—Melvin C Mayes
*Assistant Examiner*—Colette Nguyen
(74) *Attorney, Agent, or Firm*—Elwood Haynes

(57) ABSTRACT

The invention relates to a gas quenching method of the type that makes use of (i) a quenching cell (V1) which is intended to receive objects to be quenched with a quenching gas and (ii) a buffer capacity (V2) which is designed to contain the quenching gas. The invention is characterised in that following a quenching operation, all or part of the gas contained in the cell (V1) is recycled in the following manner consisting in: obtaining a first intermediate storage balloon (V3) which can receive the quenching gas from the cell; after a quenching operation, performing one or more operations comprising the partial emptying of the contents of the cell (V1) into the first intermediate storage balloon (V3), by means of partial or total pressure balancing between the two volumes of the cell (V1) and the first intermediate storage balloon; transferring the gas stored in the first intermediate storage balloon (V3) to the buffer capacity (V2); and, if necessary, releasing part of the contents of the cell (V1) into the atmosphere.

5 Claims, 3 Drawing Sheets

Figure 1:
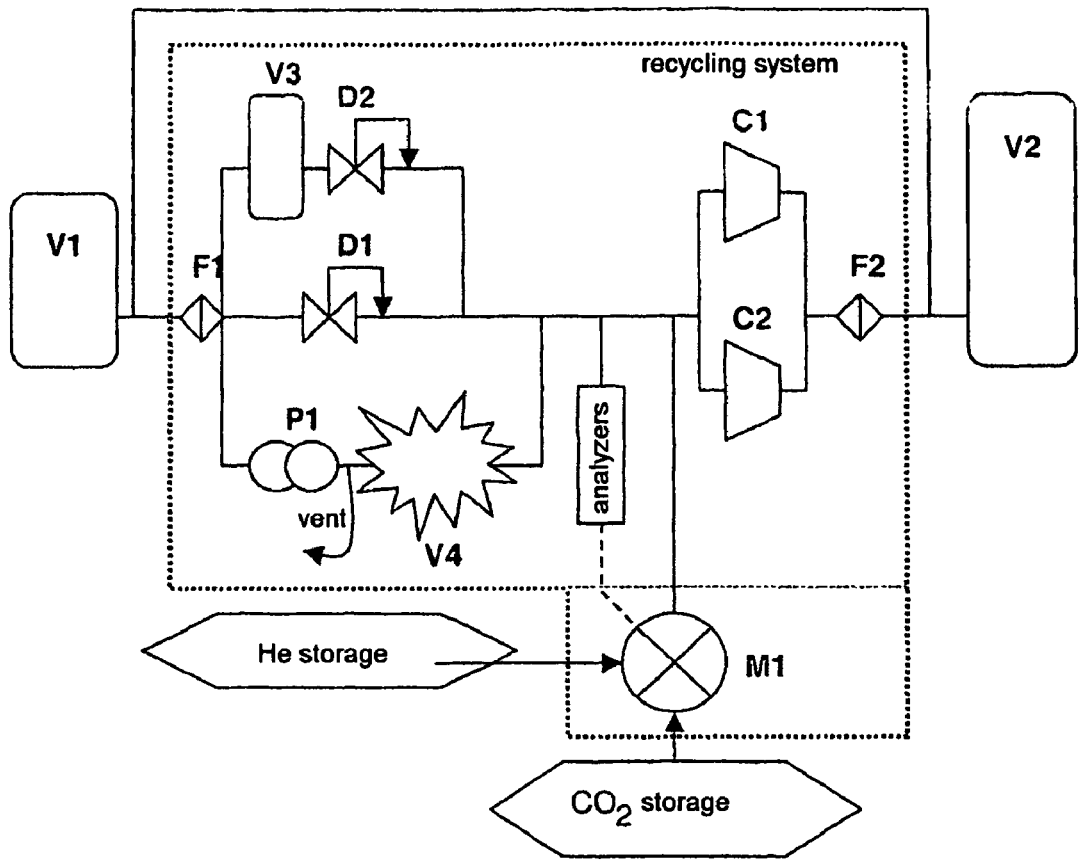

V1: Quenching cell
V2: Main buffer tank
V3: Intermediate tank
V4: Inflatable tank
P1: Vacuum pump
C1, C2: Compressors
D1, D2: Pressure reducers
F1, F2: Filtration
M1: Low pressure mixer

U.S. PATENT DOCUMENTS

| | | | | | |
|---|---|---|---|---|---|
| 5,018,551 | A | * | 5/1991 | Pelissier | 137/571 |
| 5,158,625 | A | * | 10/1992 | Lhote et al. | 148/625 |
| 7,150,777 | B2 | * | 12/2006 | Alcantara | 75/508 |
| 2002/0104589 | A1 | * | 8/2002 | Van den Sype et al. | 148/233 |

FOREIGN PATENT DOCUMENTS

| | | |
|---|---|---|
| EP | 0 451 050 | 10/1991 |
| EP | 1 211 329 | 6/2002 |
| FR | 2 634 866 | 2/1990 |
| FR | 2 835 907 | 8/2003 |

OTHER PUBLICATIONS

"Helium Recovery and Recycling Makes Good Business Sense" by Donald J Bowe, Air Products and Chemicals Inc. Allentown, Pa, Sep. 2004.*

International Search Report for PCT/FR2004/050380.

Holm, et al. *Helium recovery and cleaning for high-pressure gas quenching connected to an atmosphere furnace*. Heat Treatment of Metals, 2000, vol. 27, No. 1, pp. 9-12.

* cited by examiner

V1: Quenching cell
V2: Main buffer tank
V3: Intermediate tank
V4: Inflatable tank
P1: Vacuum pump
C1, C2: Compressors
D1, D2: Pressure reducers
F1, F2: Filtration
M1: Low pressure mixer

GAS QUENCHING METHOD USING A RECYCLING FACILITY

The present invention relates to a method and an installation for recycling a gas or gas mixture used in a gas quenching operation.

The gas quenching of steels that have previously undergone vacuum heat treatment (prequench heating, annealing, stress relieving, etc.) or thermochemical treatment (case hardening, carbonitriding, etc.) is generally carried out with a pressurized gas, preferably at between 4 and 20 bar. The gas may contain nitrogen, air, argon, helium, or any other industrial gas or gas mixture.

Improvements made in recent years to rapid steel cooling methods essentially involved the use of fluids with better heat exchange properties such as helium and hydrogen, mixtures of an inert gas with a lighter gas ($N_2$—$H_2$, $N_2$—He, etc.), and increasing the gas pressures and flow rates in the pressure vessel. Quenching cell technologies have been improved simultaneously: higher operating pressures, higher heat exchanger capacity, etc.

Certain costly gases and gas mixtures such as helium require the use of gas recovery systems suitable for transferring and recompressing the gas used during a quench, in order to use it during the next quench.

The recycling systems commonly used generally require the presence of the following apparatus:
 one or more compressors;
 a vacuum pump to obtain high gas recovery rates (to lower the pressure in the quenching cell below atmospheric pressure);
 gas purification/separation means;
 gas storage vessels (with flexible or rigid structures, see the case of document FR-2 634 866).

The following technical problems are generally encountered in such recycling systems:
 concerning the compressor: due to the pressures and flow rates required, the compressors to be used are generally piston compressors (oil-free or well-lubricated). The cost of these units, which is commensurate with the required capacity, accounts for a significant share of the cost of the recycling facility;
 concerning the vacuum pump: a vacuum pump supplies a variable delivery depending on its inlet pressure; this raises a problem of adaptation between the delivery supplied by the vacuum pump and the maximum compressor inlet flow rate;
 concerning the gas purification means: these generally make the installation more complex; moreover, conventional gas separation means require compressing the gas, either using a separate compressor unit (see for example document US2002/0104589A1), or by mobilizing the compressor mentioned above used for recompressing and transferring the gas (see for example the case of document EP 0 450 050);
 immobilization of the quenching cells: the quenching cell is immobilized by the recycling method during a large part of its operating cycle, making it unavailable for its load cooling function. This requires oversizing the capacity of the drive components (compressor, vacuum pump) in order to improve the cycle times.

It is an object of the present invention to provide an improvement of the technical problems mentioned above, by proposing a novel quenching gas recycling system architecture, permitting more efficient use of the equipment employed, and particularly of the gas recovery and compression means, in the context of the quenching of metal parts in a high pressure gas following a vacuum heat treatment.

As described in greater detail below, the present invention is suitable for:
 reducing the gas transfer time and recovery cycle time, for an identical recovery rate, compared with an installation using compression and pumping equipment designed for the same capacities, and hence in particular, decreasing the visible recovery time per quenching cell;
 using compression and pumping equipment of lower dimensional capacities compared with a conventional facility providing the same transfer time performance;
 maintaining the desired purity level without requiring the use of gas purification means;
 using gas mixtures with optimized gas consumption.

The recycling facility according to the present invention is positioned between the quenching cell (V1 in FIG. 1 below) and the buffer tank (V2) conventionally present in gas quenching installations, and comprises the following elements:
 a main line connecting the cell V1 to the tank V2 via a compressor/booster set comprising one or more compressors or boosters in parallel (system with two piston compressors C1 and C2 in FIG. 1);
 an intermediate storage tank V3 for supplying the compressor set and located on a bypass of the main line;
 according to a preferred embodiment of the invention described in greater detail below in the present application, the presence of a gas holder or inflatable tank (V4) supplied by a vacuum pump P1, also on a bypass of the main line (the vacuum pump P1 delivers either to a vent or to the tank V4);
 according to an advantageous embodiment of the invention, if a gas mixture is used for quenching, it comprises a low pressure mixing module supplying the compressor set with low pressure mixture (M1).

The volume V3 permits rapid partial emptying of the quenching cell V1 by partial or complete pressure balancing between the two volumes. This rapid emptying also has the advantage of lowering the energy consumption for stirring the gas in the cell (the lower pressure decreases the power requirement of the turbines), or serves to decrease the cooling rate in an intermediate step of the quenching method (staging).

As shown below, the tank V3 is always a key component of the invention because of the time it saves during recycling, since the gas contained in V3 can be dealt with while V1 is in operation. In fact, during the phases in which the quenching cell V1 is mobilized, for example, in the course of the gas quenching method or during load transfers, the gas stored in the tank V3 can be recompressed and transferred to the buffer tank V2.

This immobilization of V1 is associated with:
 the time during which the pressurized gas is used in the cell V1 for the quenching itself;
 the time for loading and unloading the cell V1.

The cumulative immobilization time can be estimated at a minimum of 5 minutes, which, for example for 20-minute cycles, represents a time saving of 25%.

As shown in greater detail below, this tank V3 is an absolutely novel element compared with the other recycling approaches already described in the literature, both for its positioning in relation to the other elements of the recycling circuit, and in its function and its use.

Thus document EP-1 211 329 describes an approach in which the gas extracted from the cell 20 is sent to the conventional buffer tank of the method along a main line via a whole series of purification, pumping, etc. steps.

Document EP-451 050 mentions the use of a vessel 12 called a "holding" tank. However, this tank is not to be filled directly by balancing as recommended for the present invention, because it is supplied by a compressor. The function of the tank mentioned in this prior document is actually to be able to use a single compressor for the following two functions:

pressurization of the gas for purifying the gas on the permeator 20; the gas to be purified is hence stored temporarily in this holding tank;

pressurization to fill the "process" tank 2 (equivalent to the tank V2 shown in FIG. 1 below).

Document FR-2 634 866 uses a storage vessel called a "variable volume" tank, which is a storage tank under atmospheric pressure, connected directly to the installation associated with the method. This tank performs the role of storage at atmospheric pressure which corresponds to the compressor feed pressure. Contrary to such an arrangement, the tank V3 according to the present invention is not intended for storage at atmospheric pressure, since it is a pressurized tank, and, moreover, because of the reasons already mentioned, it is positioned on a bypass of the main compressor feed line.

The document "Helium recovery and Cleaning for High-Pressure Gas Quenching Connected to an Atmosphere Furnace" which appeared in Heat Treatment of Metals, 2000, 1, pp. 9-12, gives an example of a helium recycling facility. In this case, and in the case of document EP 1 211 329, only the conventional "process" tank is shown, corresponding to the tank V2 in the sense of the present invention. The compressor present in this document is hence supplied directly from the quenching installation, without intermediate storage or other bypass.

In short, according to the present invention, after a quenching operation, the cell is emptied by recovering at least part of the gas (as long as the pressure in the tank V1 remains above atmospheric pressure):

by balancing between the tank V1 and the tank V3;

by compressing the gas remaining in V1 to a pressure threshold at least equal to atmospheric pressure; the gas thereby compressed is sent to V2; this step can, optionally, begin in the course of the balancing step;

by compressing and transferring the gas present in the tank V3 to V2; the advantage of the invention being that the tank V1 is not immobilized during this step;

if necessary, part of the content of V1 is released to the atmosphere.

As shown below, to empty the cell V1 below atmospheric pressure, it is necessary to use a vacuum pump, and this is where the tank V4 is highly advantageous.

The use of the tank V4 can be summarized as follows: in order to transfer and recompress the gas with a high recovery rate (typically above 95%), that is, to reduce the pressure in the cell V1 to below atmospheric pressure, it is necessary to recover the gas from the quenching cell V1 under vacuum. Such high recovery rates (above 95% indeed >97%) are in fact generally desirable when using costly quenching gases such as helium-based gases (for readily understandable economic reasons).

In fact, a vacuum pump does not supply a constant gas flow rate, whereas the compressors used operate at constant delivery; hence this raises a problem of adjustment between the operating flow rates of the compressor and the vacuum pump if these two types of elements are directly connected.

The tank V4 shown in the figure can be inflated to atmospheric pressure. The vacuum pump P1 more or less completely fills V4 with gas from V1, V4 being disconnected from the compressor unit, the compressor unit then empties V4 into V2, V4 being at this time disconnected from the pump P1.

During the operation of the vacuum pump and the filling of the tank V4, the compressor unit is, for example, available to directly recompress the gas present in V3 and supply V2. When V4 is full, the compressor unit recompresses the gas from V4 to supply V2. In this way, the compressor(s) is(are) used in nominal conditions, thereby saving time. The compressors thus always have an inlet pressure equal to or slightly higher than atmospheric pressure.

The tank V4 can therefore be used to dissociate the pumping and recompression steps because the vacuum pump and the compressor set are never directly connected. Thus, each unit (vacuum pump, compressor unit) is used in its nominal operating conditions.

In other words, if the tank V4 were not present, P1 would send the gas directly from V1 to the compressor/booster set, whereas in fact, the flow rate supplied by the pump P1 depends on the pressure in the cell (which varies) hence the downstream compressor also undergoes pressure variations. In this case, either the compressor operates below its nominal delivery during the vacuum formation phase, or the vacuum pump must be substantially oversized in order to supply a sufficient flow rate even when its feed pressure is itself the lowest.

It can be understood from a reading of the above that, depending on the desired recovery rate, several cycles of filling of V4, emptying of V4, can be carried out until an acceptable pressure is reached in the cell V1 (typically 100 mbar absolute for illustration).

It can be understood that, while V4 is filled, V3 is available to supply the compressor from the gas it contains and hence the tank V2.

As it will appear clearly to a person skilled in the art, the volume of V3 and, if applicable, of V4, is adjusted according to the compressor flow rates but also to the time to be saved.

The present invention accordingly relates to a gas quenching method, of the type in which a quenching cell receives objects to be quenched with a quenching gas, and comprising means for supplying pressurized quenching gas, connected to this cell, means for supplying gas comprising a buffer tank for containing quenching gas, characterized in that, after a quenching operation, all or part of the gas contained in the cell is recycled as follows:

a main line connects the cell to said buffer tank via a compressor or booster set comprising one or more compressors/boosters in parallel;

a first intermediate storage tank receives quenching gas from the cell and feeds the compressor/booster set, and is located on a bypass of the main line;

after a quenching operation, the contents of the cell are emptied in one or more operations into the first intermediate storage tank by partial or complete pressure balancing between the two volumes of the cell and of the first intermediate storage tank;

the gas stored in said first intermediate storage tank is transferred to the buffer tank (V2) via the compressor/booster set;

if necessary, part of the content of the cell is released to the atmosphere.

The method according to the invention may further comprise one or more of the following features:

the gas stored in said first intermediate storage tank is transferred to the buffer tank during a phase in which the quenching cell is immobilized in the course of the gas quenching method or during load transfers;

an inflatable tank also located on a bypass of the main line, receives gas from the cell via a vacuum pump delivering either to a vent or to said inflatable tank, and in that the inflatable tank is used as follows: after said one or more partial emptyings of the content of the cell into the first intermediate storage tank, and in order to lower the pressure in the cell below atmospheric pressure, the gas contained in the cell is transferred to the inflatable tank in one or more operations as follows:

the gas present in the cell is recovered from the inflatable tank using the vacuum pump, the inflatable tank being disconnected from the compressor/booster set, and then the gas present in the inflatable tank is emptied using the compressor/booster set, the inflatable tank being disconnected from the vacuum pump (P1).

Figure 2:
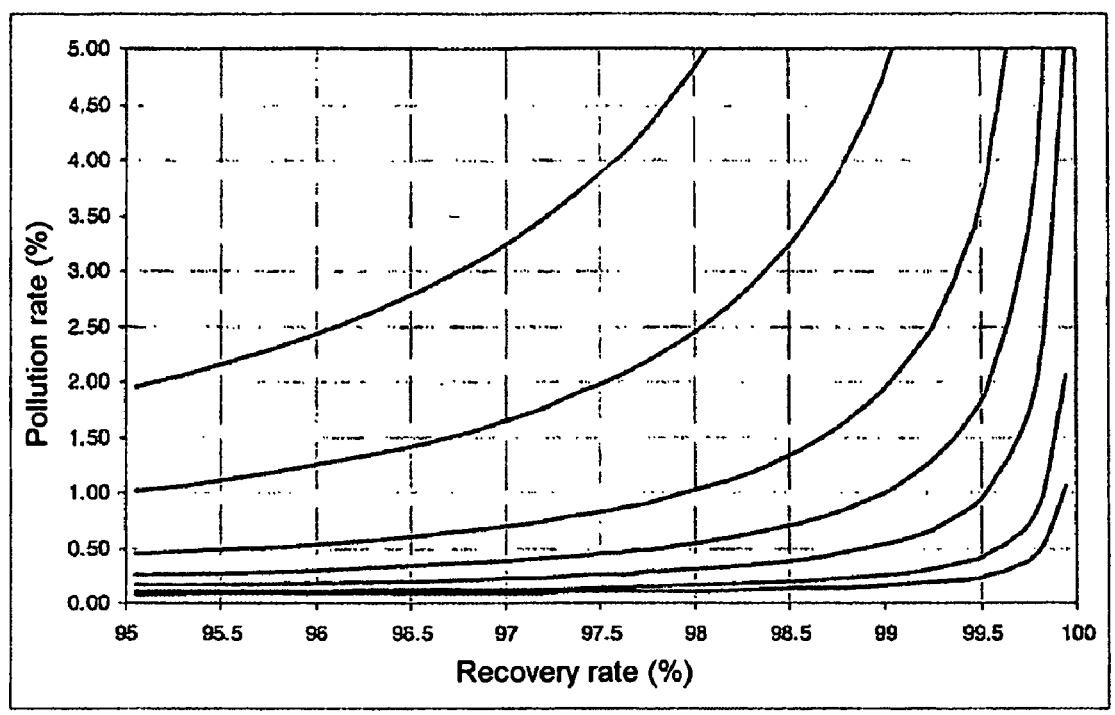
Figure 3:
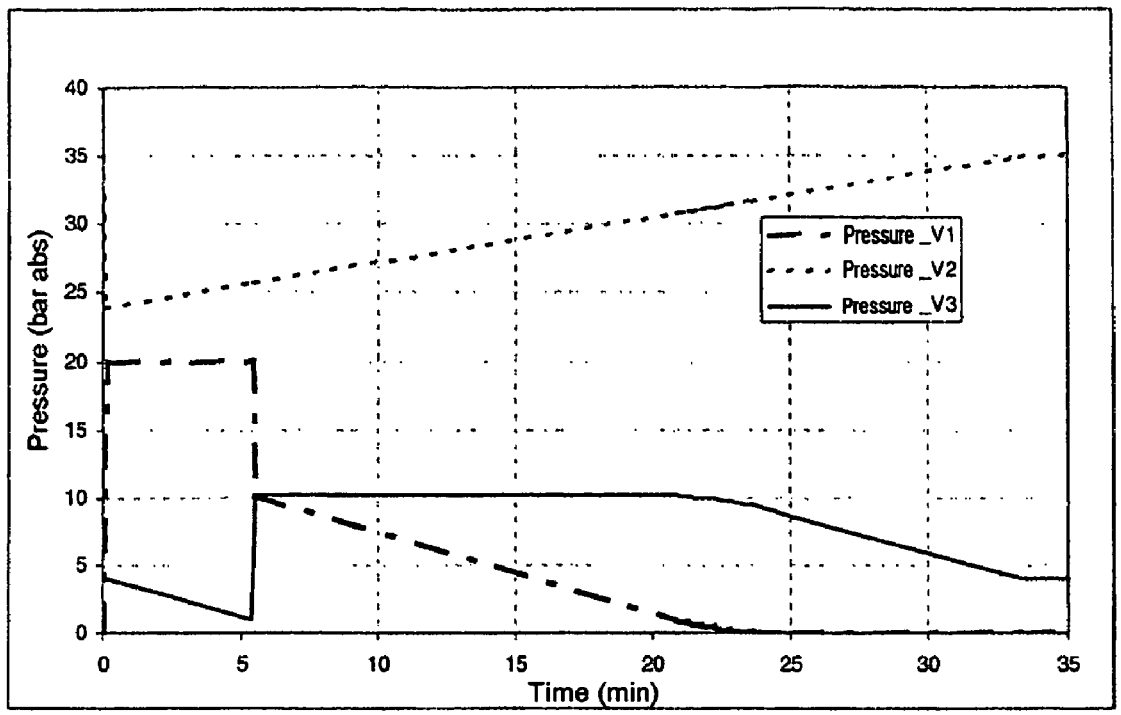
Figure 4:
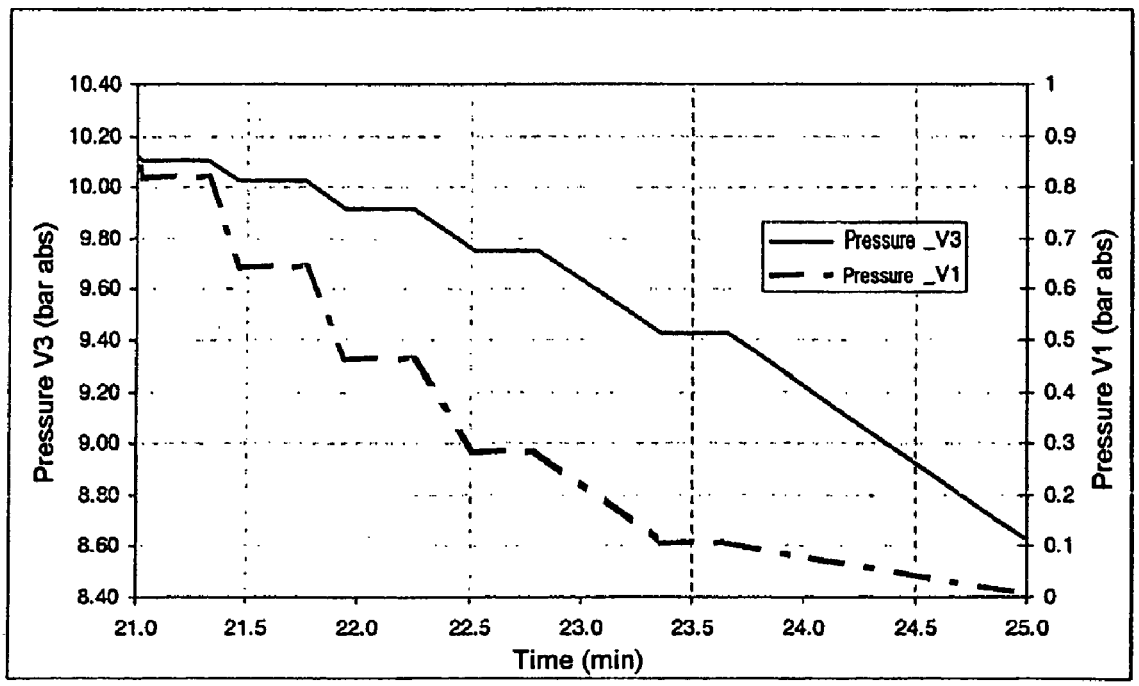

The invention will be better understood from a reading of the description below, given exclusively as an example and with reference to the drawings appended hereto in which:

FIG. 1 is a schematic representation of an installation for implementing the invention;

FIG. 2 gives the results of simulations of the maximum pollution content (content in the gas recycled from V2 and reused in the quenching cell) as a function of the gas recovery rate for various initial pollution levels in the quenching gas recovered from cell V1;

FIG. 3 gives an example of recycling according to the invention with variation in the pressures in the tanks V1, V2 and V3 during the gas quenching and recompression cycle;

FIG. 4 shows the detail of the variation in the pressures of the tanks V1 and V3 during steps 4 and 5 of Table 1 (substantially between 21 and 25 min).

FIG. 1 shows all the elements already abundantly described and referenced above, and particularly the cell V1, the buffer tank V2, the piston compressor set comprising two compressors C1 and C2 in parallel, the intermediate storage tank V3 for supplying the compressor set and positioned on a bypass of the main line, the inflatable tank V4, also on a bypass of the main line, and the vacuum pump P1 delivering either to a vent or to the tank V4.

The figure shows the presence, between the pump and the tank V4, of a venting valve (symbolized by a curved discharge arrow) for discharging to the atmosphere, when desired, part of the gas extracted from V1.

This obviously depends on the desired gas recovery rate: part is recycled to the method and part is discharged to the atmosphere. For example, the gas extracted from V1 can be discharged when the pressure in V1 falls below a preset threshold, which can be defined as the recovery pressure according to the recovery rate selected.

As already indicated above, according to an advantageous embodiment of the invention in the case of the use of a gas mixture for quenching (the figure shows the case of a $CO_2$/helium mixture), the installation comprises a mixing module (M1) supplying the compressor set with low pressure mixture.

The mixture can be synthesized at a more or less high pressure.

Advantageously, it is proposed here to synthesize the mixture at low pressure (below 10 bar) and to recompress the mixture using the compressor/booster set in order to empty the gas storage tanks to the maximum. Synthesizing the mixture at high pressure serves to avoid using a compressor to supply the high pressure tank with fresh gas. On the other hand, a low pressure mixing system serves to use the gas storage tanks as long as the pressure of said tanks remains higher than the feed pressure. The amount of unused consumed gas remaining in the gas tanks is therefore smaller, allowing for lower operating costs. Since the gas recovery system described necessarily comprises a compressor, it is therefore more favorable to prepare the mixture at low pressure. Thus, the compressor set of the gas recycling system is used to provide the make-up fresh gas.

In an advantageous embodiment of the invention, the mixing module comprises a dedicated tank for storing the synthesized fresh mixture.

This tank can also be filled in parallel sequence time in relation to the other phases. The quantity of fresh gas synthesized is controlled simply by the pressure of this tank.

Hence the mixture synthesis rate can be dimensioned independently of the rate of the other elements, particularly of the compressor for recompressing the mixture.

In the concrete example given in Table 1, the mixture is synthesized during one or more of the steps 0 to 5. When the pressure in V2 is balanced using the fresh mixture in step 6, the fresh mixture filling rate hence corresponds to the nominal delivery of the compressor. If mixtures are used, it is particularly recommended to control the gas composition using an analyzer (as shown in the figure) to monitor and adjust the composition of the mixture during recycling in case of preferential leakage from one of the components during the quenching and/or recycling cycle.

By way of illustration, various types of analysis are possible including:

the main components of the mixture;

the pollutants indicative of a leak (such as oxygen, nitrogen);

the pollutants associated with the method: such as $H_2O$, $CO$, $N_2$, or hydrocarbons, wastes from the heat treatment preceding the quenching operation.

The installation may also comprise a robot for controlling the installation, particularly defining the filling and emptying sequences of the various components.

The data used by the robot can be supplied by:

temperature and pressure sensors in the various tanks V1, V2, V3, V4;

a tank V3 filling indicator;

a tank V4 filling indicator;

the gas analyzer.

Based on these data, the robot can control:

the switching of the valves sending the gas to one tank or another;

adjustment of the mixer;

starting and stopping of the pump set, etc.

Table 1 below shows a concrete case, with details of the various steps and their durations.

The time saved compared with an installation comprising neither V3 nor V4 is between 5 and 10 minutes, depending on the time needed to transfer the loads of parts to be treated (step 6).

During the successive quenching and recovery operations, the quenching gas is enriched with impurities/pollutants. However, these impurities are diluted by the make-up gas made necessary by the incomplete recovery of the quenching gas. The impurity content thus remains below an upper limit depending on both the pollutant contents added in each quenching cycle and the gas recovery rate, which is directly related to the make-up gas added in each cycle. FIG. 2 shows the result of simulations of this maximum impurity content (content in the gas recycled from V2 and reused in the quenching cell) as a function of the gas recovery rate, for various initial pollution levels in the quenching gas recovered from the cell V1: one curve per initial pollution level, considering the curves from the uppermost in the figure to the lowest, they correspond respectively to initial pollution contents of 10, 20, 50, 100, 200, 500 and 1000 ppm.

TABLE 1

Steps of gas recompression and transfer from V1 to V2

| Step | From t = (min) | To t = (min) | Description |
|---|---|---|---|
| 0 | 0 | 0.1 | V1 filled for quenching |
| 1 | 0.1 | 5.4 | Pressurized quenching (in parallel, gas transfer from V3 to V2) |
| 2 | 5.4 | 5.5 | V1-V3 balancing (partial emptying of V1) |
| 3 | 5.5 | 20.9 | Recompression from V1: the gas, not balanced between V1 and V3, is sent to V2 directly via the compressor set (up to atmospheric pressure) |
| 4 | 20.9 | 23.7 | Vacuum production in V1 with gas transfer to V2; use of tank V4. |
| 5 | 23.7 | 25.0 | Vacuum lowered in V1; gas from V1 vented (because recovery rate different from 100%) |
| 6 | 25.0 | 35.0 | Gas transfer from V3 to V2 and pressure balancing in V2 and holding; removal of quenched load, charging of load to be quenched. |

In order to keep the gas cooling properties constant, a 5% pollution rate is perfectly acceptable. For example, to be noted is the addition of 5% of nitrogen to a mixture of $CO_2$ and helium containing 50% of helium which causes a 1.5% reduction in the heat flux transferred by the gas; this decrease is imperceptible in the final properties of the treated parts.

In the case of vacuum heat treatments, the level of impurities added in each cycle does not exceed 500 ppm. In this case, a 99% recovery rate serves to maintain a sufficient level of purity, without using gas separation means to limit the pollutant content.

FIG. 3 shows an example of recycling according to the invention with the variation in pressures of the tanks V1, V2, V3 during the gas quenching and recompression cycle (example corresponding to Table 1):
  solid line: pressure in V3;
  dotted line (. . . . . .): pressure in V2;
  dashed-dotted line (. _ . _ . _ . _): pressure in V1.

FIG. 4 shows the details (zoom) of the variation in pressures in tanks V1 and V3, between 21 and 25 min (substantially during steps 4 and 5 of Table 1). It serves to distinguish the various steps of the simultaneous use of the vacuum pump to empty V1 and the compressor to empty V3, and the emptying of the inflatable tank using the compressor (pressures V1 and V3 stable).

The non-gas impurities (water, oil, dust) are removed using dedicated filters.

The invention claimed is:

1. A gas quenching method, of the type in which a quenching cell (V1) receives objects to be quenched with a quenching gas, and comprising means for supplying pressurized quenching gas, connected to this cell, means for supplying gas comprising a buffer tank (V2) for containing quenching gas, characterized in that, after a quenching operation, all or part of the gas contained in the cell (V1) is recycled as follows:
    a) a main line connects the cell (V1) to said buffer tank (V2) via a compressor or booster set comprising one or more compressors/boosters in parallel (C1, C2, etc.);
    b) a first intermediate storage tank (V3) receives quenching gas from the cell and feeds the compressor/booster set, and is located on a bypass of the main line;
    c) after a quenching operation, the contents of the cell (V1) are emptied in one or more operations into the first intermediate storage tank (V3) by partial or complete pressure balancing between the two volumes of the cell (V1) and of the first intermediate storage tank;
    d) the gas stored in said first intermediate storage tank (V3) is transferred to the buffer tank (V2) via the compressor/booster set; and if necessary, part of the content of the cell (V1) is released to the atmosphere.

2. The gas quenching method as claimed in claim 1, characterized in that the gas stored in said first intermediate storage tank (V3) is transferred to the buffer tank (V2) during a phase in which the quenching cell (V1) is immobilized in the course of the gas quenching method or during load transfers.

3. The gas quenching method as claimed in claim 1, characterized in that said quenching gas is a gas mixture, and in that a low pressure mixing module supplies the compressor/booster set with gas mixture (M1), and in that the mixing module comprises a dedicated tank for storing the fresh mixture thus synthesized.

4. The gas quenching method as claimed in claim 3, characterized in that said dedicated tank is filled in parallel sequence time in relation to the progress of the other phases of the method.

5. The gas quenching method as claimed in claim 4, characterized in that the quantity of synthesized fresh gas is controlled by the pressure in the dedicated tank.

* * * * *